United States Patent [19]

Adams et al.

[11] 4,445,954

[45] May 1, 1984

[54] METHOD OF MANUFACTURING MOLDED UPHOLSTERY PANELS

[75] Inventors: Ronald W. Adams, Auburn, Me.; Carl V. Leunig, Glenmont, N.Y.; Robert F. Kovar, Wrentham, Mass.

[73] Assignee: Albany International Corp., Albany, N.Y.

[21] Appl. No.: 465,101

[22] Filed: Feb. 9, 1983

[51] Int. Cl.³ .......................... B29C 3/00; B32B 31/20
[52] U.S. Cl. .................................. 156/148; 156/242; 156/245; 156/308.4; 156/322
[58] Field of Search ................. 156/148, 158, 82, 219, 156/220, 242, 245, 252, 290, 322, 308.4

[56] References Cited

U.S. PATENT DOCUMENTS

| | | | |
|---|---|---|---|
| 2,573,466 | 10/1951 | Lyijynen | 156/219 |
| 2,578,709 | 12/1951 | Lyijynen | 156/219 |
| 2,618,581 | 11/1952 | Lyijynen | 156/220 |
| 3,046,179 | 7/1962 | Stallard | 156/219 |
| 3,454,449 | 7/1969 | King | 156/82 |
| 3,829,343 | 8/1974 | Remmert | 156/82 |
| 3,833,439 | 9/1974 | Smith | 156/252 |
| 4,199,635 | 4/1980 | Parker | 156/62.2 |

Primary Examiner—Caleb Weston
Attorney, Agent, or Firm—Kane, Dalsimer, Kane, Sullivan and Kurucz

[57] ABSTRACT

Disclosure is made of a new and novel method of producing upholstered and padded panels. The panels are useful to upholster the interior of transportation vehicles.

1 Claim, 1 Drawing Figure

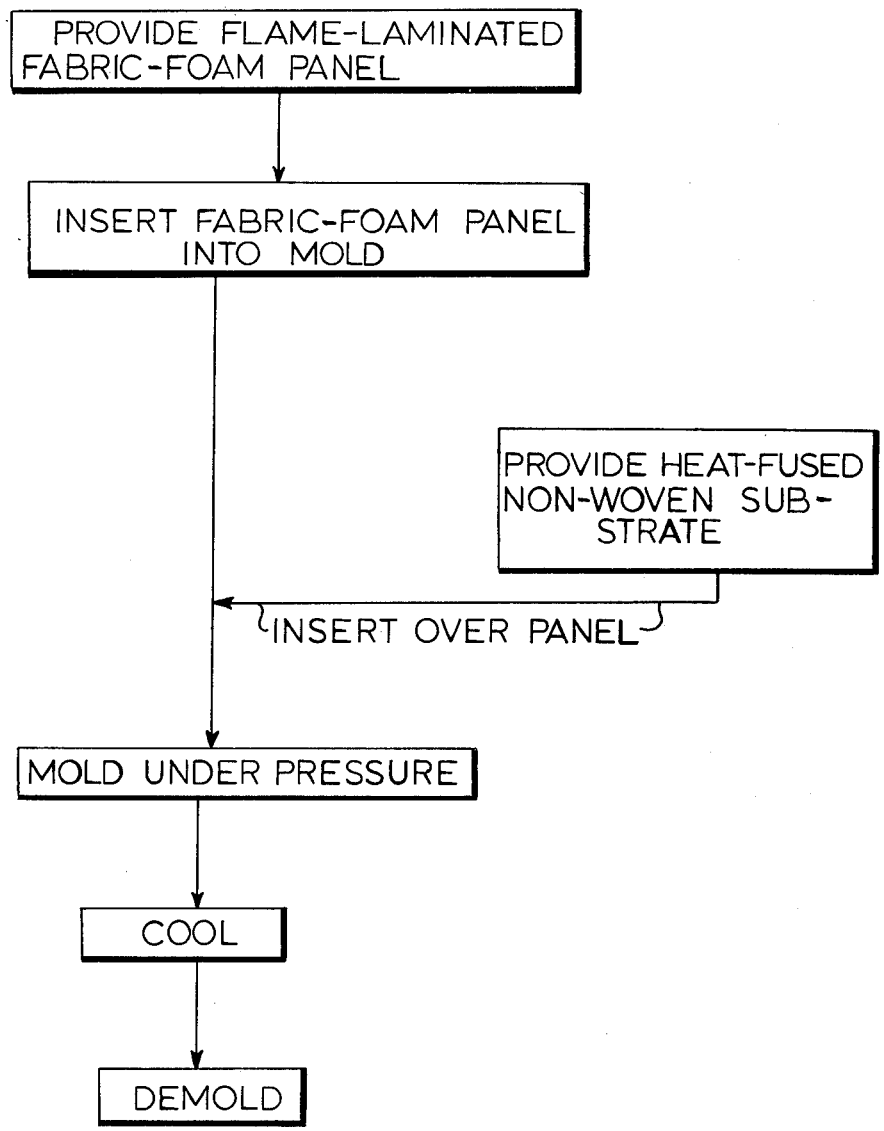

METHOD OF MANUFACTURING MOLDED UPHOLSTERY PANELS

BACKGROUND OF THE INVENTION

1. Field of the Invention

The invention relates to decorative, upholstered panels and methods for their manufacture.

2. Brief Description of the Prior Art

The prior art literature is replete with descriptions of a wide variety of methods for the manufacture of upholstery panels, commonly used to upholster the interior of transportation vehicles such as automobiles, airplanes and the like. Representative of such descriptions is that found in U.S. Pat. No. 4,199,635.

In recent years, the automobile industry has been interested in padded upholstery panels with a decorative surface. For example, a door panel may be upholstered with a facing of carpeting material, imitation leather or a vinyl supported by an underlying layer of a polymeric resin foam. Prior to the present invention, panels of the type described above were made by bonding the various materials to a molded substrate in a multi-step operation. Bonding could be effected by the dielectric process, adhesives or like techniques. The substrate is normally cardboard, pressboard, injection molded polymeric resin sheets, non-woven sheets or the like.

The method of the present invention permits one to manufacture padded and upholstered panels having a decorative face. The joining, bonding and molding of the component parts takes place during a single molding step without the use of of adhesives, making for lower cost panels. The panels prepared by the process of the invention are esthetically acceptable and pleasing in appearance. The elimination of the use of glues and adhesives in their manufacture is also an advantage, reducing the hazards of solvents generally associated with the use of glues and adhesives.

In comparison to some prior art panels containing polymeric resins, the panels of the present invention are also advantageous in that they are relatively non-volatile, producing few gases which can condense and deposit on surfaces near their installation, for example, on the interior of an automobile. This phenomena has been observed in recent years and is considered a serious drawback to the use of certain polymeric resin panels in vehicle interiors.

SUMMARY OF THE INVENTION

The invention comprises a method of manufacturing a padding upholstered, decorative panel having a decorative fabric surface and polymeric resin foam padding, which comprises:

(a) providing a panel base support which comprises; a core of non-woven, synthetic textile fibers; a base first layer of heat fusible, synthetic, thermoplastic textile melt fibers; a base second layer of heat fusible, synthetic, thermoplastic textile melt fibers; said first and second layers sandwiching the core, fibers of said first layer and the core being interengaged with each other and with the second layer, said interengagement being of the character obtained by needling;

(b) providing a panel intermediate layer of a synthetic, open or closed cell, thermoplastic polymeric resin foam;

(c) providing an outer, surface layer of a decorative, surface upholstery material;

(d) assembling the intermediate layer (b) with the surface layer (c) and securing said layers (b) and (c) together;

(e) providing a mold adapted by size and configuration to receive the assembly, said mold including a means for applying heat and pressure along the peripheral edges of the assembled layers (a), (b) and (c) when the assembly is received in the mold;

(f) inserting the assembly (d) in the mold;

(g) heating the base support (a) to a temperature sufficient to fuse the melt fibers;

(h) inserting the heated base support (a) in the mold in a position wherein said support (a) contacts the exposed surface of the foam layer (b);

(i) applying heat and pressure on the assembly in the mold; whereby peripheral edge portions of the surface layer (c) are bonded to the base layer (a);

(j) cooling the molded panel; and (k) demolding the molded panel.

The invention also comprises the panel products of the method of the invention. The panel products are useful as upholstered liners for the interior of transportation vehicles and the like.

BRIEF DESCRIPTION OF THE DRAWING

The FIGURE accompanying this specification is a schematic flow diagram showing a preferred embodiment method of the invention.

DETAILED DESCRIPTION OF THE PREFERRED EMBODIMENTS OF THE INVENTION

The accompanying drawing is a schematic flow diagram showing a preferred embodiment method of the invention. As shown in the FIGURE, there is first provided a panel base support as described above. This base support functions as a panel substrate in the method of the invention. The substrate is a laminate which comprises an upper outer layer of thermoplastic, heat fusible textile fibers. A lower outer layer may be a film of a synthetic, polymeric resin, but is preferably of thermoplastic heat fusible fibers similar to the upper outer layer. The outer layers sandwich a core of non-woven textile fibers. All of the layers and the core are consolidated by lamination under heat and pressure as described hereinafter to form an integrated laminate substrate structure of high strength, resistant to delamination. The substrate may be prepared by first laying down a web or first layer of woven, knit or non-woven thermoplastic, synthetic, heat fusible polymeric resin fibers. Representative of such fibers are staple fibers of polyolefins such as polyethylene, polypropylene and the like. Preferably the first layer will have a weight of from about 200 to about 700 grams per meter square and a thickness of from about 3 to about 12 millimeters. In manufacture, the first layer receives on one surface an even layered distribution, of loose, unconsolidated, synthetic textile fibers as a core layer. The synthetic fiber material forms a covering or core layer to receive on its own outer surface a second web of woven or non-woven, synthetic thermoplastic, fusible fibers to sandwich the core layer between outer webs. The outer webs may be identical to each other or alternatively one may be a film of a fusible, synthetic, thermoplastic resin such as a film of polyethylene or polypropylene. The sandwich structure consisting of outer layers and core layer are needled together employing conventional needling techniques to consolidate and integrate the three layers. The techniques for needling textile layers together are well-known and need not be considered in detail herein; see for example the descriptions of needling techniques in U.S. Pat. Nos. 2,059,132; 2,910,763 and 3,684,284. Thus, fibers of three layers are interengaged and interlocked with one another, said interengagement being of the character obtained by needling. Preferably, needling is in a single pass with a 32 gauge multibarbed needle set to a density of from 46 to 187 needles per inch. The resulting composite web which comprises the substrate for use in the method of the invention is subjected to heat at a temperature slightly above the softening point temperature of the synthetic, fusible fibers in the outer layers. This fuses the melt fibers.

In addition to providing a heat-fused, non-woven substrate for the method of the invention, there is also provided a desired facing fabric, in an appropriate size and configuration, pre-assembled to a layer of a polymeric resin foam (which functions as the upholstery padding). Preferably, pre-assembly is accomplished by flame-laminating the foam layer to the decorative, facing fabric. Methods of bonding polymeric resin materials to carpeting, vinyls, etc. by flame-lamination are well known. Representative of preferred foams so laminatable are cross-linked polyethylene foams, polyethylene foams, polyvinyl chloride foams and like polymeric resin foams. Most preferably these foams will be characterized by 1. Low cost
2. Fusibility under heat and pressure
3. Fusibility into thin film of high strength
4. Adhesion to fabric and substrate
5. Low flammability
6. High compressibility The facing fabrics, for decoration, may be carpet materials woven or knit textiles, leather, or sheets of polymeric resins such as imitation leather, polyvinyl chloride and the like.

In the next step of the method of the invention, the pre-assembled fabric/foam panel is placed in the mold. Then, the heated substrate with molten fibers is placed in the mold, upon the exposed foam surface of the pre-assembled fabric/foam panel. Under heat and pressure in the mold, the face or decorative layer is bonded to the substrate layer. In fact, under heat and pressure the decorative face layer is fused into the substrate layer.

The techniques of molding textile/thermoplastics under heat and pressure are well known as is the apparatus for doing so; see for example U.S. Pat. Nos. 4,044,188 and 4,258,093. In general, a molding press may be employed which comprises a lower, stationary platen or mold member such as the female mold member. A moving platen or mold member may be heated to the fusion temperature of the melt fibers in the substrate if desired. Under heat and pressure in the press, consolidation of the above described composite layers of the substrate panel also takes place. The heat fused fibers in the substrate are expressed against the foam layer so that the foam layer may bond thereto through the fused fiber melt from the substrate. The pressure exerted in the press is preferably within the range of from about 5 psi to 400 psi to effect the above described consolidation of the layers. The product panel may then be allowed to cool in the mold and is removed from the press by demolding. When cooled, the formed panel will maintain its shape as formed and will exhibit dimensional stability, shape retention and durability. The panels also exhibit advantageous properties of sound and thermal insulation. The panel may be part of the interior upholstery and equipment of an automobile. They are particularly useful for the latter application in that they exhibit the following combination of properties:

a. Adhesion of fabric to foam at edges
b. Adhesion of foam to fused substrate
c. Complete compression and fusion of foam at edges
d. Retention of foam compressibility in center sections
e. Adequate peel strength between fabric, foam and fused surface
f. Acceptable flammability rating
g. Stability to 185° F. without shrinkage or distortion
h. Dramatically improved manufacturing process
i. Low cost.

The method of the invention is an improvement over prior art methods in that cycle times may be as short as 10 minutes and reject rates as low as 5 percent. Obviously multi-cavity molds can be used in this process.

What is claimed:

1. A method of manufacturing a padding upholstered, decorative panel having a decorative fabric surface and polymeric resin foam padding, which comprises;
    (a) providing a panel base support which comprises; a core of non-woven, synthetic textile fibers; a base first layer of heat fusible, synthetic, thermoplastic textile melt fibers; a base second layer of heat fusible, synthetic, thermoplastic textile melt fibers; said first and second layers sandwiching the core, fibers of said first and second layers and the core being interengaged with each other, said interengagement being of the character obtained by needling;
    (b) providing a panel intermediate layer of a synthetic, open or closed cell, thermoplastic polymeric resin foam;
    (c) providing an outer, surface layer of a decorative, surface upholstery materials;
    (d) assembling the intermediate layer (b) with the surface layer (c) and securing said layers (b) and (c) together;
    (e) providing a mold adapted by size and configuration to receive the assembly, said mold including a means for applying heat and pressure along the peripheral edges of the assembled layers (a), (b) and (c) when the assembly is received in the mold;
    (f) inserting the assembly (d) in the mold;
    (g) heating the base support (a) to a temperature sufficient to fuse the melt fibers;
    (h) inserting the heated base support (a) in the mold in a position wherein said support (a) contacts the exposed surface of the foam layer (b);
    (i) applying heat and pressure on the assembly in the mold; whereby peripheral edge portions of the surface layer (c) are bonded to the base layer (a);
    (j) cooling the molded panel; and
    (k) demolding the molded panel.

* * * * *